United States Patent
Morovic et al.

(10) Patent No.: US 10,334,142 B2
(45) Date of Patent: *Jun. 25, 2019

(54) COLOR PROFILE ADJUSTMENT

(71) Applicant: HEWLETT-PACKARD DEVELOPMENT COMPANY, L.P., Houston, TX (US)

(72) Inventors: Peter Morovic, Sant Cugat del Valles (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/458,741

(22) Filed: Mar. 14, 2017

(65) Prior Publication Data
US 2017/0187926 A1  Jun. 29, 2017

Related U.S. Application Data

(63) Continuation of application No. 13/173,940, filed on Jun. 30, 2011, now Pat. No. 9,736,337.

(51) Int. Cl.
*H04N 1/40* (2006.01)
*H04N 1/60* (2006.01)

(52) U.S. Cl.
CPC .......... *H04N 1/6025* (2013.01); *H04N 1/603* (2013.01); *H04N 1/6008* (2013.01); *H04N 1/6058* (2013.01); *H04N 2201/3256* (2013.01)

(58) Field of Classification Search
CPC ........ G06G 2340/06; G06G 5/06; H04N 1/60; H04N 1/603; H04N 1/6058; H04N 9/68; G03F 2001/133614; G03F 2001/133616; G03F 2001/133317; G03F 2001/133624; G02F 2203/34; G02F 1/1313; G02F 1/133603; G02F 1/133615; G02F 1/133621; G02F 1/00; G02F 1/0102; G02F 1/133509; G02F 1/1336; G02F 1/13609; G02F 1/13718
USPC ......................................................... 358/3.23
See application file for complete search history.

(56) References Cited

U.S. PATENT DOCUMENTS

| | | | |
|---|---|---|---|
| 5,581,480 A * | 12/1996 | Olson ....................... | G06T 1/00 704/278 |
| 6,480,299 B1 | 11/2002 | Drakopoulos et al. | |
| 6,762,858 B2 | 7/2004 | Haro | |
| 6,778,300 B1 | 8/2004 | Kohler | |
| 7,417,769 B2 | 8/2008 | Hasler et al. | |
| 2004/0130739 A1* | 7/2004 | Adam ................ | H04N 1/00068 358/1.9 |

(Continued)

*Primary Examiner* — Gabriel I Garcia
(74) *Attorney, Agent, or Firm* — Tarolli Sundheim Covell & Tummino LLP (57) ABSTRACT

In some examples, a system receives a color sample comprising a color measurement of a proper subset of a gamut of colors printable by a printer, and computes a forward transform value and a reverse transform value based on a color profile calculated from a profiling chart comprising a set of estimated color samples calculated based on the received color sample, the forward and reverse transform values to convert between colorimetry values and color values for the printer. The system provides an adjusted color profile for the printer based on an original color profile for the printer and the computing, wherein the original color profile for the printer is associated with a substrate.

20 Claims, 6 Drawing Sheets

(56) References Cited

U.S. PATENT DOCUMENTS

| | | |
|---|---|---|
| 2005/0195415 A1 | 9/2005 | DeBaer |
| 2006/0007457 A1 | 1/2006 | Namikata |
| 2006/0290954 A1 | 12/2006 | Stokes et al. |
| 2008/0130023 A1* | 6/2008 | Perez .................. H04N 1/6033 358/1.9 |
| 2009/0010536 A1 | 1/2009 | Mizukami |
| 2009/0284554 A1* | 11/2009 | Doser ..................... G09G 5/02 345/690 |

* cited by examiner

COLOR PROFILE ADJUSTMENT

CROSS REFERENCE TO RELATED APPLICATION

This is a continuation of U.S. application Ser. No. 13/173,940, filed Jun. 30, 2011, which is hereby incorporated by reference in their entirety.

BACKGROUND

In color management, an International Color Consortium (ICC) profile is a set of data that characterizes a color input or output device, or a color space, according to standards promulgated by the ICC. Profiles describe the color attributes of a particular device or viewing requirement by defining a mapping between the device source or target color space and a profile connection space (PCS). This PCS can be a CIELAB (LAB) color space or a CIEXYZ (XYZ) color space. Mappings can be specified using tables, to which interpolation is applied, or through a series of parameters for transformations. A device that captures or displays color can have its own ICC profile. Some manufacturers provide profiles for their products, and there are several products that allow end users to generate and/or modify the ICC profile for a given device, for example by employing a tristimulus colorimeter or a spectrophotometer.

A LAB color space is a color-opponent space with dimension L for lightness and A and B for the color-opponent dimensions, based on nonlinearly compressed CIEXYZ color space coordinates. LAB color space is designed to approximate human vision. Since LAB color space is much larger than the gamut of computer displays, printers, or even human vision, a bitmap image represented as the LAB requires more data per pixel to obtain the same precision as a red, blue green (RGB) or cyan, magenta, yellow, black (CMYK) bitmap. In a XYZ color space, tristimulus values called X, Y, and Z, which are roughly red, green and blue, respectively.

DETAILED DESCRIPTION

Figure 1:
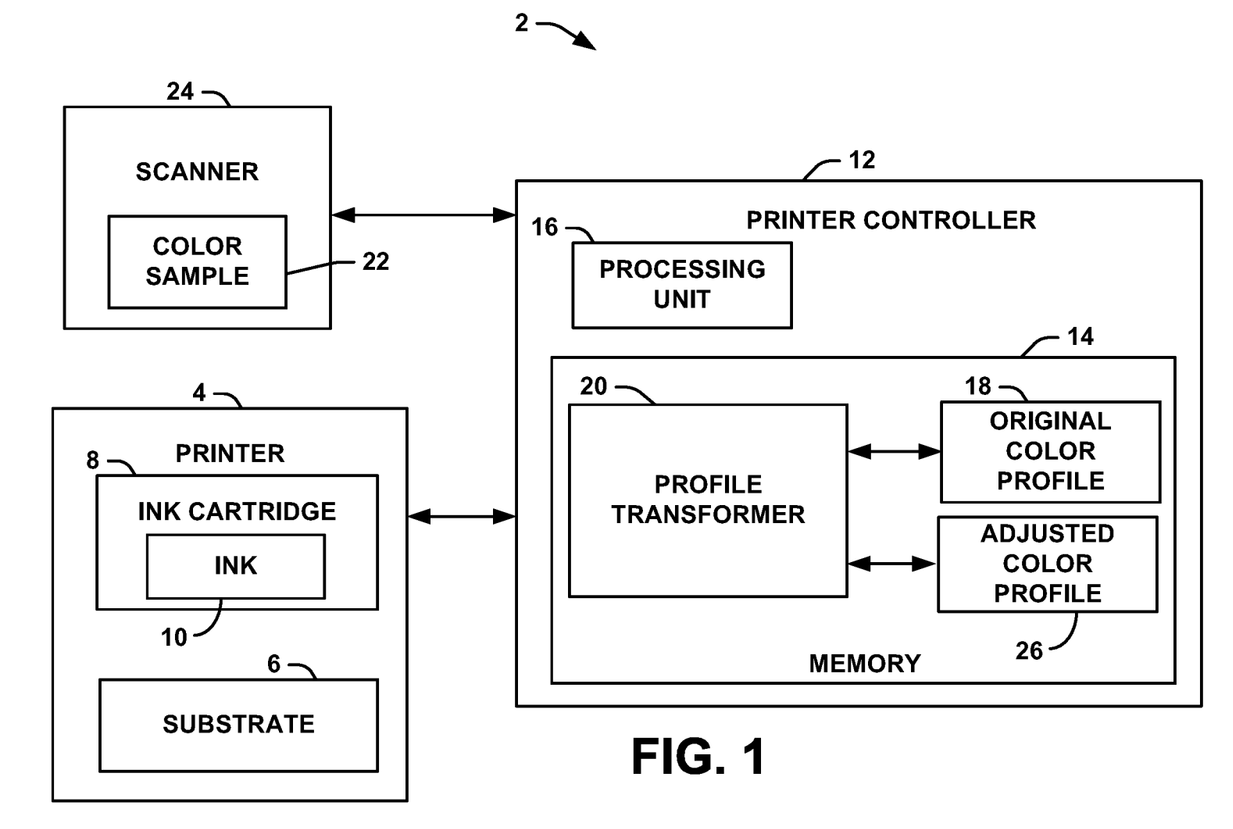
FIG. 1 illustrates an example of a printing system for adjusting a color profile.

FIG. 1 illustrates an example of a print system 2. The print system 2 can include a printer 4 that can print color ink onto a substrate 6. The printer 4 could be implemented, for example, as a laser printer, inkjet printer, a line printer line, etc. The substrate 6 can be, for example, standard paper, newsprint paper, glossy paper, a banner, a billboard, a combination thereof, etc. The printer 4 can have a cartridge 8 loaded with ink 10. The ink 10 could be implemented, for example, as color printer ink, or color toner. In some examples, multiple cartridges 8 could be employed wherein each such cartridge 8 stores a single color, while in other examples multiple ink colors could be implemented in a single cartridge 8.

For purposes of simplification of explanation, in the present example, different components of the print system 2 are illustrated and described as performing different functions. However, one of ordinary skill in the art will understand and appreciate that the functions of the described components can be performed by different components, and the functionality of several components can be combined and executed on a single component. The components can be implemented, for example, as software (e.g., computer executable instructions), hardware (e.g., an application specific integrated circuit), or as a combination of both (e.g., firmware). In other examples, the components could be distributed among remote devices across the network 6 (e.g., external web services).

The printer 4 can be controlled by a printer controller 12. In some examples, the printer controller 12 could be integrated with the printer 4. In other examples, the printer controller 12 could be implemented as a separate computer, such as a personal computer or a server. The printer controller 12 can include a memory 14 for storing computer executable instructions. The printer controller 12 can also include a processing unit 16 for accessing the memory 14 and executing the computer executable instructions. The processing unit 16 can be implemented, for example, as a processor core. The memory 14 can include an original color profile 18 for the printer 4. The original color profile 18 could be implemented, for example, as an International Color Consortium (ICC) profile. The original color profile 18 can include a forward color lookup table that defines a forward transform value, sometimes referred to as an "AToB tag," for converting between CMYK values for the printer 4 and colorimetry values, such as CIELAB (LAB) values or CIEXYZ (XYZ) values. The original color profile 18 can also include a reverse color lookup table that can define a reverse transform value, sometimes referred to as a "BToA tag" for converting between colorimetry values, such as the LAB values or XYZ values and CMYK values (or other colorimetry values) for the printer 4.

The original color profile 18 can be employed to print ink 10 onto a particular substrate 6 at the printer 4 with a particular ink, which ink can be referred to as "old ink." Moreover, a different color profile can be provided to accommodate a plurality of different substrates loadable at the printer 4. That is, each color profile can define the color printing characteristics of a given substrate.

In some situations, for a variety of reasons, the ink 10 used by the printer 4 can change. Such a change may be related, for example, to a changing manufacturer of the ink 10. In such a situation, the colorimetry of the new ink 10 at the printer 4 could change relative to the old ink. Thus, upon depositing new ink 10 into the printer 4 via a cartridge 8 it may be necessary to adjust to the original color profile 18 for the printer 4. In some examples, the adjustment of the original color profile 18 can be initiated by a message embedded in the circuit of the cartridge 8. In other examples, adjustment of the original color profile 18 can be initiated by a user of the printer controller 12.

Upon initiation of the color adjustment, a profile transformer 20 stored in the memory 14 can access the original color profile 18 for the printer 4. The profile transformer 20 can initiate the printing of a color sample 22 for the new ink 10 deposited into the printer 4. The color sample 22 can represent a proper subset of the color gamut printable with the new ink 10 deposited in the printer 4. For instance, in some examples, the color sample 22 may contain 24 colors, while the gamut printable by the printer 4 with the new ink 10 contains hundreds or thousands of colors. Upon printing the color sample 22, a scanner 24 can scan the color sample 22 and provide a color measurement of the color sample 22 (or individual color measurements) to the profile transformer 20 of the printer controller 12. In some examples, the scanner 24 can be implemented as a system external to the printer 4, while in other examples, the scanner 24 can be integrated into the printer 4. In one example, the scanner 24 can include a colorimeter and/or a spectrophotometer to scan/measure the color sample 24.

Upon reception of the color sample 22 (in digitized form) by the profile transformer 20, the profile transformer 20 can provide an adjusted color profile 26. To provide the adjusted color profile 26, the profile transformer 20 modifies and/or augments the forward color lookup table of the original color profile 18 and updates each node in the forward color lookup table to reflect a new relationship by modeling a new CMYK to colorimetry transform. To provide the lookup table for the adjusted color profile 26, the profile transformer 20 can calculate a forward transform value (e.g., an AToB tag). Additionally, the profile transformer 20 modifies and/or augments the reverse color lookup table of the color profile and updates each node in the reverse color lookup table to provide a reverse color lookup table for the adjusted color profile 26. To provide the reverse lookup table for the adjusted color profile 26, the profile transformer 20 can calculate a reverse transform value (e.g., a BToA tag). The resultant adjusted color profile 26 can be an ICC profile.

Subsequently, color printing can commence at the printer 4, such that little to no change between colors printed with the new ink 10 and the old ink at the printer 4 exist. Utilization of the print system 2 allows the adjusted color profile 26 to be provided based on a relatively sparse sampling of the system's color gamut 10 deposited at the printer 4. Additionally, no actual knowledge of the operational characteristics of the printer 4 is needed to provide the adjusted color profile 26. Further, the profile transform can also employ the forward and reverse transform values calculated for the adjusted color profile 26 to adjust other color profiles that are associated with different substrates with similar characteristics. For instance, forward and reverse transform values calculated to adjust a color profile for newsprint could be used to adjust a color profile associated with other types of paper without the need to recalculate the forward and reverse transform values or printing a measuring a new color sample 22.

Figure 2:
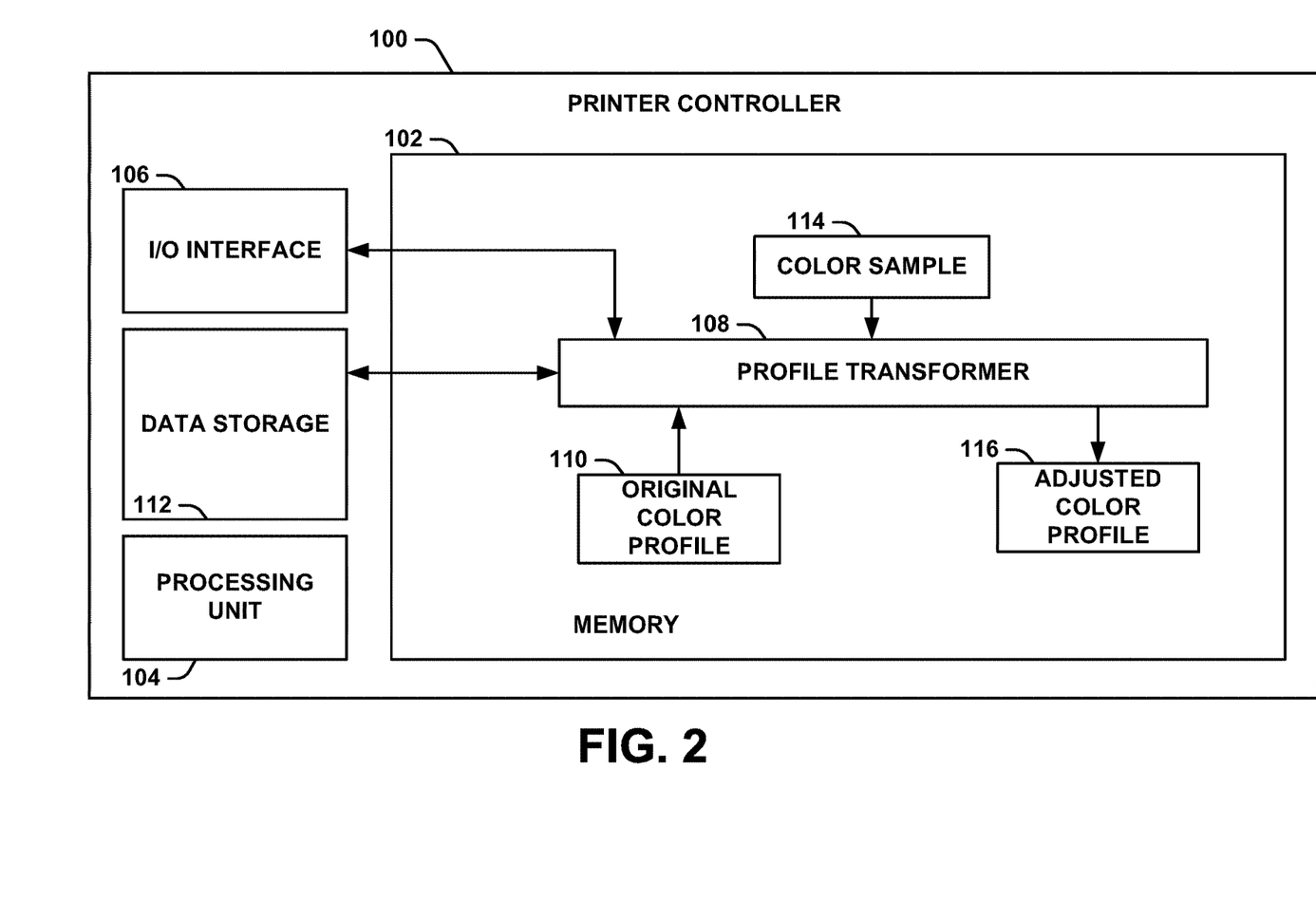
FIG. 2 illustrates an example of a printer controller for adjusting a color profile.

FIG. 2 illustrates an example of a printer controller 100 that could be employed as the printer controller 12 illustrated in FIG. 1. The printer controller 100 can include a memory 102 for storing computer executable instructions. The memory 102 could be implemented, for example, as random access memory (RAM), flash memory, a hard disk drive, etc. The printer controller 100 can also include a processing unit 104 for accessing the memory 102 and for executing the computer executable instructions stored in the memory 102. The processing unit 104 can be implemented, for example, as a processor core.

The printer controller 100 can include an I/O interface 106 for communicating with a printer and a scanner, such as the printer 4 and the scanner 24 illustrated in FIG. 1. In some examples, the printer controller 100 can be a system external to the printer. In such a situation, the I/O interface 106 can be implemented as a network or universal serial bus (USB) port. In other examples, the printer controller 100 can be implemented as a system integrated with the printer and/or the scanner. In such a situation, the I/O interface 106 can include a data bus for communicating with the printer and/or the scanner.

The memory 102 can include a profile transformer 108 that adjusts a color profile for the printer upon initiation of a color profile adjustment. The adjustment to the color profile can be needed in situations where new ink is deposited at the printer (hereinafter, "new ink"), and the new ink has different color properties (e.g., a color temperature) than ink previously used by the printer, (hereinafter, "old ink"). Upon initiation of the color adjustment, the profile transformer 108 can access an original color profile 110 from data storage 112 for the printer and the old ink on a given substrate. The data storage 112 could be implemented, for example, as nonvolatile memory, such as flash memory, a hard disk, etc.

The original color profile 110 could be implemented, for example, as an ICC profile. The original color profile 110 can include a forward color lookup table that defines a forward transform for converting between CMYK values of the old ink for the printer and colorimetry values, such as LAB values or XYZ values. The original color profile 110 can also include a reverse color lookup table that can also define a reverse transform for converting between colorimetry values, such as the LAB values or XYZ values and CMYK values for the old ink of the printer. The original color profile 110 can be employed to print with the old ink onto a substrate at the printer. Moreover, a plurality of original color profiles 110 can be included for each particular substrate loadable at the printer. For instance, a first original color profile 110 can define forward and reverse transforms for glossy paper loaded at the printer for the old ink, while a second original color profile 110 can define forward and reverse transforms for newsprint loaded at the printer.

The printer controller 100 can receive a color sample 114 of the new ink printed on the substrate. The color sample 114 can be implemented, for example, as a digitized (e.g., scanned) version of a relatively small proper subset of the full color gamut that can be printed with the new ink. For instance, in some examples, the color sample 114 can include 28 different colors, while the full color gamut can include hundreds or thousands of colors. The profile transformer 108 can provide an adjusted color 116 profile for the new ink based on an examination of the color sample 114 and the original color profile 110. The profile transformer 108 can operate in a variety of different ways, as discussed herein.

Figure 3:
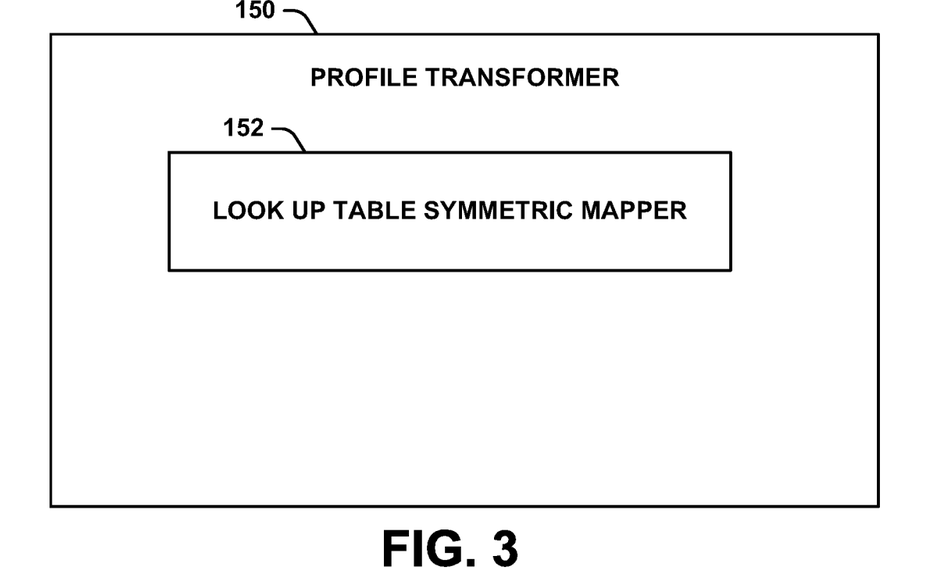
FIG. 3 illustrates an example of a profile transformer for providing an adjusted color profile.

FIG. 3 illustrates an example profile transformer 150 that could be employed as the profile transformer 108 illustrated in FIG. 2. In the example illustrated in FIG. 3, to provide the adjusted color profile 116 illustrated in FIG. 2, the profile transformer 150 can examine the forward color lookup table of the original color profile 110 illustrated in FIG. 2 and find matches in the forward color lookup table for each color in the color sample 114 illustrated in FIG. 2. The profile transformer 150 can examine the matches found in the forward color lookup table of the original color profile 110 to determine a relationship between CMYK values and colorimetry values (e.g., LAB values or XYZ values) to calculate a forward transform value. By employing the original color profile 110, the found matches and the forward transform value, the profile transformer 150 can populate a forward color lookup table for the adjusted color profile 116. Thus, the adjusted color profile 116 can include the forward color lookup table that defines a forward transform value for converting between CMYK values for new ink at the printer and colorimetry values, such as LAB values or XYZ values.

The profile transformer 150 can include a lookup table symmetric mapper 152. In such a situation, the lookup table symmetric mapper 152 presumes that the forward color lookup table of the original color profile 110 is symmetric with the reverse lookup table of the original color profile 110. In such a symmetric lookup table, an input value into a forward transform function that employs a forward transform value would result in a value which value, when applied to a reverse transform that employs a reverse transform value results in the input value. In this manner, the profile transformer 150 can employ the reverse lookup table of the original color profile 110, the reverse transform value (being the same as the forward transform value) and the color sample 114 to populate the reverse color lookup table for the adjusted color profile 116. This example of the profile transformer 150 can provide the same color gamut that was available in the original color profile 110. Moreover, in this example, the profile transformer 150 avoids the need for an expensive third-party utility, such as a profiling engine and/or a profile settings estimation engine.

Figure 4:
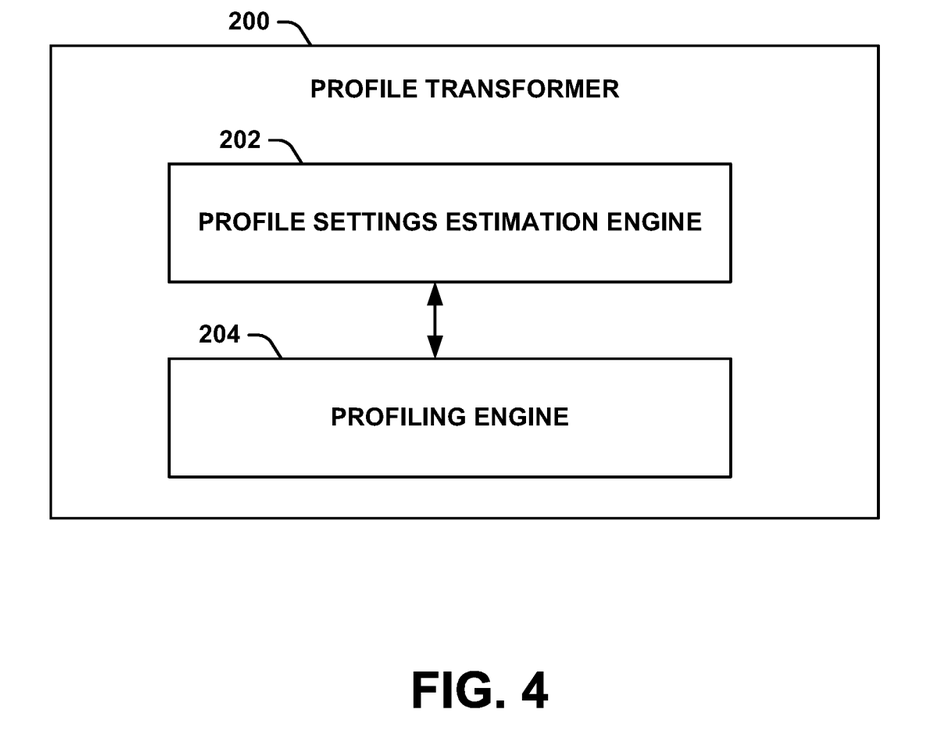
FIG. 4 illustrates another example of a profile transformer for providing an adjusted color profile.

FIG. 4 illustrates another example of a profile transformer 150 that could be employed as the profile transformer 108 illustrated in FIG. 2. In the example illustrated in FIG. 4, the profile transformer 200 can populate a forward color lookup table for the adjusted color profile 116 illustrated in FIG. 2 in a manner similar to the profile transformer 150 illustrated in FIG. 3.

To populate a reverse color lookup table for the adjusted profile, the profile transformer 200 can employ a profile settings estimation engine 202 to examine the forward and reverse color lookup table of the original color profile 110 illustrated in FIG. 2. It is noted that although the profile settings estimation engine 202 is illustrated in FIG. 3 as being integrated with the profile transformer 200, it is to be understood that in some examples, the profile settings estimation engine 202 could be operating on a external system. As described with respect to FIG. 1, in some examples, settings of a color profile can be modified. The profile settings estimation engine 202 can deduce the settings employed to generate and/or modify the original color profile 110. The deduction of the settings can include an estimation of black-generation (or gray component replacement) strategy used to compute the original color profile 110. As an example, different black generation strategies can vary in the areas and amounts of black (K) values ranging, for example, from (i) only using black (K) where it is needed to reach the maximum gamut (minimum gray-component replacement) to (ii) using black (K) for all (or nearly all) of a gray-axis and/or whenever equal parts of cyan (C), magenta (M) or yellow (Y) can be substituted for black (K).

To deduce the settings taken for the computation of the original color profile 110, a simple brute-force approach can create multiple profiles by employing a profiling engine 204 from nodes of the forward color lookup table of the adjusted color profile 116, which were not subject to the settings that apply to a reverse transform direction, while varying the black generation and other settings (e.g., gamut mapping, smoothing, etc.). Although the profiling engine 204 is illustrated as being integrated with the profile transformer 200, in some example, the profiling engine 204 can be executed on an external system. The newly generated profiles that best correspond to the original profile (generated with unknown settings) can be examined. To execute the examining of the newly generated profiles, a set of colorimetry values (e.g., LAB values) can be processed through the various newly generated profiles reverse color lookup table values and comparing the resulting CMYK values. The profile transformer 200 can employ the results of the examination to populate the reverse color lookup table for the adjusted color profile 116. By employing the profile transformer 200 illustrated in FIG. 4, the color gamut for the adjusted color profile 116 can be increased relative to the color gamut of the original color profile 110. Furthermore, no actual knowledge of the settings for the original color profile 110 is needed.

Figure 5:
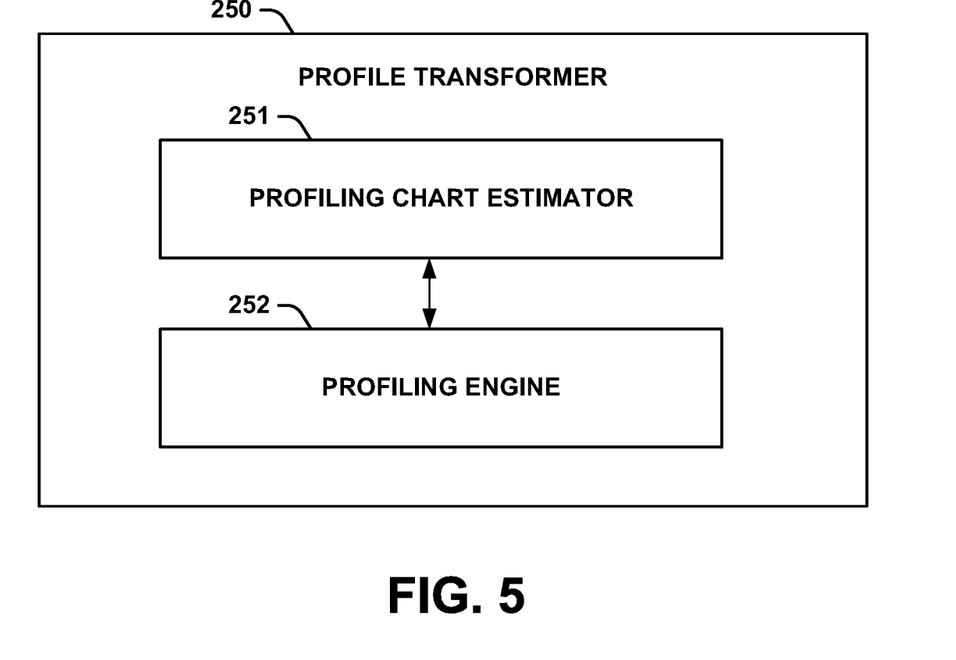
FIG. 5 illustrates yet another example of a profile transformer for providing an adjusted color profile.

FIG. 5 illustrates yet another example of a profile transformer 250 that could be employed as the profile transformer 108 illustrated in FIG. 2. In this example, the profile transformer 250 can include and/or communicate with a profiling chart estimator 252 and a profiling engine 252 (sometimes referred to as a profiler) to generate a new color profile as the adjusted color profile 116 illustrated in FIG. 2. Although the profiling chart estimator 252 and the profiling engine 252 are illustrated as being integrated with the profile transformer 250, in some examples, the profiling chart estimator 252 and/or the profiling engine 252 can be executed on an external system. The profiling chart estimator 252 can calculate an estimated forward transform value (AToB tag) for converting between device colors (e.g., CMYK values for new ink at the printer) and colorimetry values (e.g., LAB values or XYZ values). The estimation of the forward transform value can be based on the color sample 144 illustrated in FIG. 2 and the original color profile 110 illustrated in FIG. 2. Moreover, the profiling chart estimator can employ the estimated forward transform value to populate a profiling chart. The profiling chart can contain, for example, 1000 estimated color samples, and the profiling chart can be input into the profiling engine.

The profiling engine 252 can be implemented as a software tool with algorithms to calculate a correspondence between device dependent colors (e.g. the printer's CMYK values in the original color profile 110) and device-independent colorimetry, represented as colorimetry values (LAB or XYZ values). The profiling engine 252 can employ the profiling chart provided by the profiling chart estimator 251 to facilitate the calculation of the correspondence. Calculation of the correspondence can include, for example computation of both (i) a forward transform value (e.g., a AToB tag) which results in series of transforms values that employ the printer's CMYK values and mapping them to colorimetry, as well as a reverse transform value (e.g., BToA tag) where colorimetry is mapped to printer's CMYK color values. It is noted that the forward transform value (e.g., AToB tag) calculated by the profiling engine 252 may be the same or different than the estimated forward transform value calculated by the profiling chart estimator 251.

The forward and reverse transform values can be calculated and optimized to address the entire color gamut of the printer and to ensure that transitions between colors within the color gamut are smooth. Settings can be set in the process of calculating the forward and reverse transform values. In one such example, such settings can include a setting of black-generation for printer profiles that determine how much and when black (K) ink is employed for neutral colors. Additionally or alternatively, other settings can determine a number of nodes in the forward or reverse color lookup table that encodes part of the transformation. The settings can vary based on the particular implementation of the profiling engine 252 employed. Thus, the profile transformer 250 can populate both forward and reverse color lookup tables for the adjusted color profile 116. By employing this example of the profile transformer 250, a maximum color gamut for the printer can be achieved, while still needing only a relatively small proper subset of colors (e.g., the color sample 114) to provide the adjusted color profile 116.

Referring back to FIG. 2, upon population of both the forward and reverse color lookup tables for the adjusted color profile 116, the profile transformer 108 can write the adjusted color to the data storage 112. In some examples, the profile transformer 108 can also write forward and reverse transform values that are associated with the adjusted color profile 116 to the data storage 112 as part of the adjusted color profile 116 and/or as a separate file in the data storage 112. Accordingly, the adjusted color profile 116 can be used to print color images on a substrate associated with the original color profile 110. Additionally, the calculated forward and reverse transform values can be employed to provide adjusted color profiles 116 for different substrates without needing to print and measure a new color sample 114.

Figure 6:
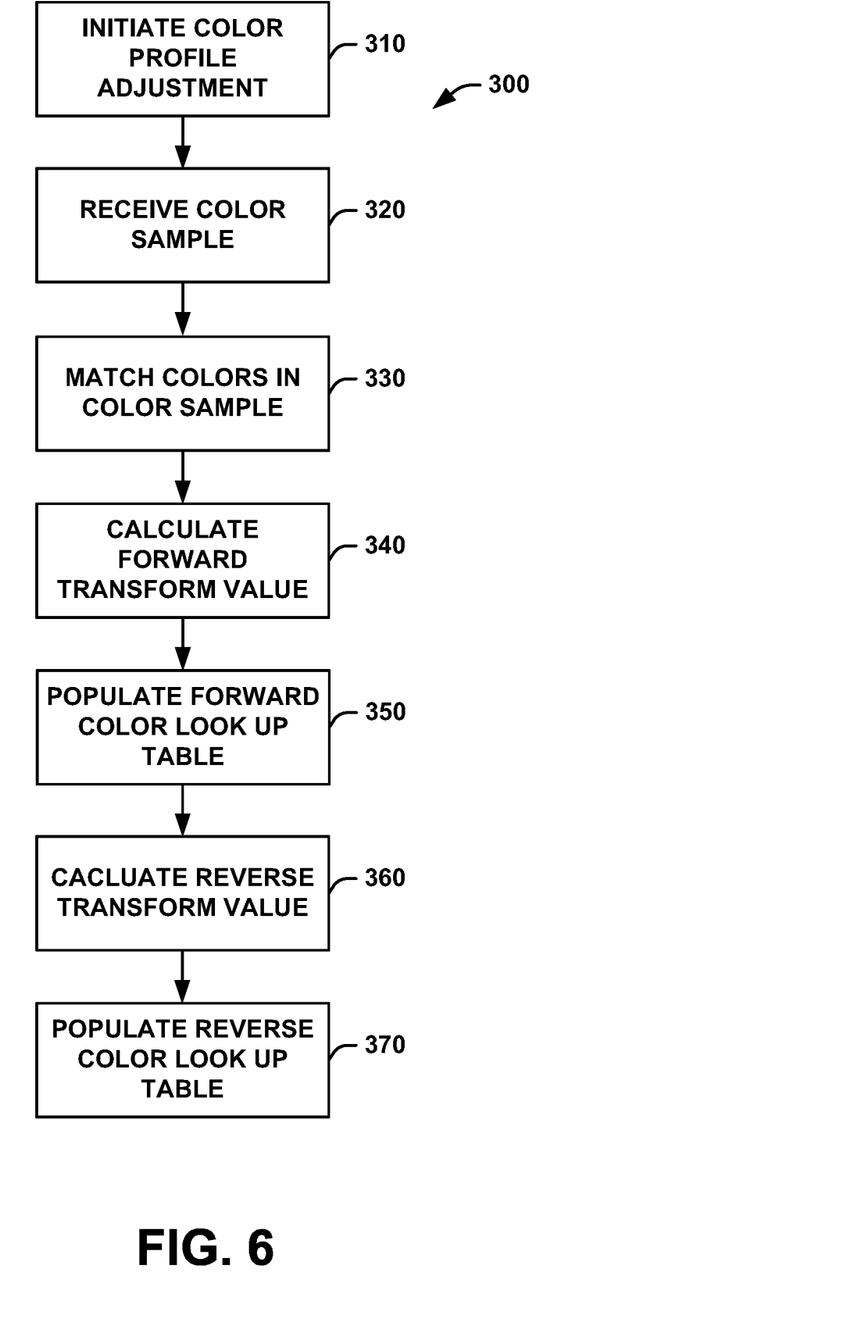
FIG. 6 illustrates an example of a flowchart of an example method for adjusting a color profile.
Figure 7:
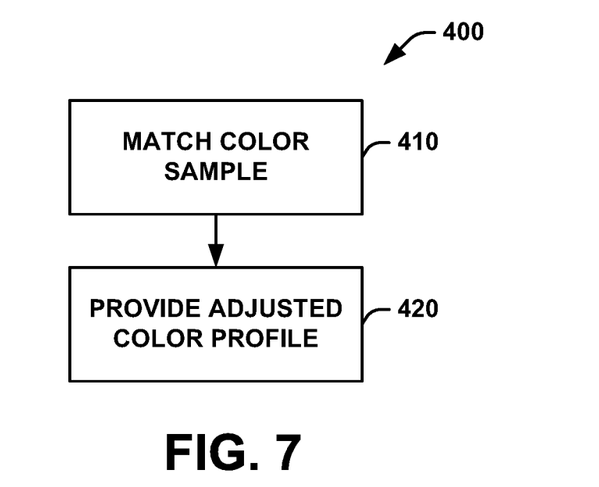
FIG. 7 illustrates another example of a flowchart of an example method for adjusting a color profile.

In view of the foregoing structural and functional features described above, example methods will be better appreciated with reference to FIGS. 6-7. While, for purposes of simplicity of explanation, the example methods of FIGS. 6-7 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 6 illustrates a flow chart of an example method 300 for adjusting a color profile. The method 300 could be executed, for example, by a print system (e.g., the print system 2 illustrated in FIG. 1 and/or the print controller 50 illustrated in FIG. 2). In such a situation, a printer can be associated with a printer controller and an original color profile (e.g., an ICC profile) for a particular substrate, which color profile defines a relationship between operations of the printer and the colors printed by the printer with a given ink which can be referred to as old ink. At 310, a color profile adjustment can be initiated. The color profile adjustment can be initiated, for example, upon depositing new ink into a printer associated with the printer controller. The new ink can be chemically different from the old ink. At 320, a color sample can be received at a profile transformer of the printer controller. The color sample can be implemented, for example, as a digitized version of a proper subset of the color gamut printable by the printer with the new ink.

At 330, colors in the color sample can be matched by the profile transformer with colors defined in the original color profile. At 340, from the matched color samples, the profile transformer can calculate a forward transform value that defines a forward relationship between the original color profile and an adjusted color profile. At 350, a forward color lookup table for the adjusted color profile can be populated by the profile transformer. At 360, a reverse transform value can be calculated. In some examples, the reverse transform value can calculated such that the forward color lookup table is symmetric with respect to a reverse color lookup table of the adjusted color profile. In other examples, the reverse transform value can be based on a deduction of settings of the color profile. In still other examples, the reverse transform value can be calculated based on a color profile that is generated based on an estimated color profiling chart. At 370, the reverse transform value can be employed to populate the reverse color lookup table of the adjusted color profile. The adjusted color profile (e.g., an ICC profile) can be employed to print color images on a substrate associated with the original color profile. Moreover, the forward and reverse transform values calculated for the adjusted color profile can be used to adjust color profiles associated with similar substrates.

FIG. 7 illustrates another flowchart of an example method 400 for adjusting a color profile. At 410, each of a plurality of colors in a color sample can be matched with a color in a color gamut defined by an original color profile for a printer. The color gamut can comprise a superset of colors relative to the color sample. At 420, an adjusted color profile can be provided for the printer based on the original color profile and the matching.

Figure 8:
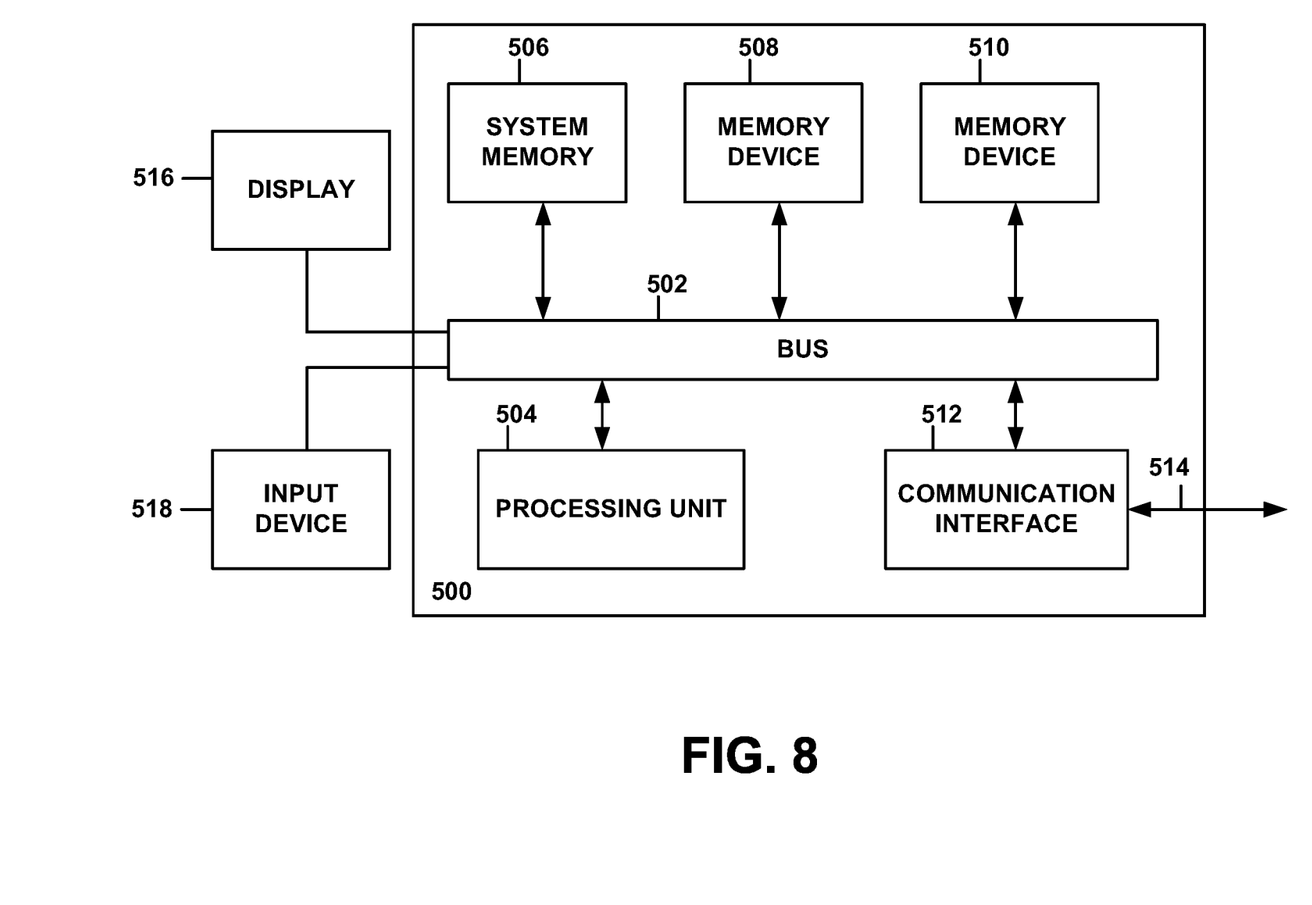
FIG. 8 illustrates an example of a computer system that can be employed to implement the systems and methods illustrated in FIGS. 1-7.

FIG. 8 is a schematic block diagram illustrating an example system 500 of hardware components capable of implementing examples disclosed in FIGS. 1-7, such as the printer controller 12 as well as portions of the printer 4 illustrated in FIG. 1 and/or the scanner 24 illustrated in FIG. 1. The system 500 can include various systems and subsystems. The system 500 can be a personal computer, a laptop computer, a workstation, a computer system, an appliance, an application-specific integrated circuit (ASIC), a server, a server blade center, a server farm, a mobile device, such as a smart phone, a personal digital assistant, an interactive television set, an Internet appliance, portions of a printer, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand alone database, or other non-volatile memory, can also be in communication with the system bus 502. The system bus 502 operably interconnects the processing unit 504, the memory devices 506-510, the communication interface 512, the display 516, and the input device 518. In some examples, the system bus 502 also operably interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processor core.

The additional memory devices 506, 508 and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio.

Additionally, the memory devices 508 and 510 can serve as databases or data storage such as the data storage 112 illustrated in FIG. 2 and/or the memory 14 or 102 illustrated in FIGS. 1 and 2. Additionally or alternatively, the system 500 can access an external system (e.g., a web service) through the communication interface 512, which can communicate with the system bus 502 and the communication link 514.

In operation, the system 500 can be used to implement, for example, a printer, a printer controller and/or a scanner. Computer executable logic for implementing the system, such as the memory 14 of the printer controller 12 illustrated in FIG. 1 and or the memory 102 of the printer controller 100 illustrated in FIG. 2, can reside in the system memory 506, and/or in the memory devices 508 and/or 510 in accordance with certain examples. The processing unit 504 executes computer executable instructions originating from the system memory 506 and the memory devices 508 and 510. In such an example, the system memory 506 and/or the memory devices 508 and/or 510 could be employed, for example, to implement the memory 14 illustrated in FIG. 1 and/or the memory 102 illustrated in FIG. 2. The term "computer readable medium" as used herein refers to a medium that participates in providing instructions to the processing unit 504 for execution.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A system comprising:
   a processor; and
   a non-transitory storage medium storing instructions executable on the processor to:
   receive a color sample comprising a color measurement of a proper subset of a gamut of colors printable by a printer;
   compute a forward transform value and a reverse transform value based on a color profile calculated from a profiling chart comprising a set of estimated color samples calculated based on the received color sample, the forward and reverse transform values to convert between colorimetry values and color values for the printer; and
   provide an adjusted color profile for the printer based on an original color profile for the printer and the computing, wherein the original color profile for the printer is associated with a substrate.

2. The system of claim 1, wherein the original color profile comprises a forward color lookup table and a reverse color lookup table.

3. The system of claim 2, wherein the instructions are executable on the processor to further populate the forward color lookup table and the reverse color lookup table for the adjusted color profile based on the original color profile and the color sample.

4. The system of claim 3, wherein the forward color lookup table and the reverse color lookup table are symmetric.

5. The system of claim 3, wherein the reverse transform value is calculated based on a deduction of settings of the original color profile.

6. The system of claim 5, wherein the deduced settings define a black (K) value for each of a plurality of colors in a color gamut.

7. The system of claim 3, wherein a color gamut of the adjusted color profile is larger than a color gamut of the original color profile.

8. The system of claim 3, wherein the instructions are executable on the processor to further provide a different color profile for a printing fluid deposited by the printer based on a different original color profile associated with a different substrate and the forward and reverse transform values of the adjusted color profile.

9. The system of claim 1, wherein the instructions are executable on the processor to generate the adjusted color profile based on the forward transform value or the reverse transform value.

10. The system of claim 1, wherein the instructions are executable on the processor to:
    calculate an estimated forward transform value based on the received color sample; and
    populate the profiling chart comprising the set of estimated color samples using the estimated forward transform value, the estimated forward transform value different from the forward transform value computed based on the color profile calculated from the profiling chart.

11. A method comprising:
    receiving, by a system comprising a processor, a color sample comprising a color measurement of a subset of a gamut of colors printable by a printer;
    computing, by the system, a forward transform value and a reverse transform value based on a color profile calculated from a profiling chart comprising a set of estimated color samples calculated based on the received color sample, the forward and reverse transform values to convert between colorimetry values and color values for the printer; and
    providing, by the system, an adjusted color profile for the printer based on an original color profile for the printer and the computing, wherein the original color profile for the printer is associated with a substrate.

12. The method of claim 11, further comprising populating a forward color lookup table and a reverse color lookup table for the adjusted color profile.

13. The method of claim 11, further comprising:
    using, by the printer, the adjusted color profile in performing a printing operation.

14. The method of claim 11, wherein the receiving, the computing, and the providing are performed in response to a new printing fluid provided to the printer, the new printing fluid differing chemically from a printing fluid previously used by the printer.

15. The method of claim 11, further comprising:
    populating a reverse color lookup table of the adjusted color profile using the reverse transform value; and
    populating a forward color lookup table of the adjusted color profile using the forward transform value.

16. The method of claim 11, wherein a color gamut of the adjusted color profile is larger than a color gamut of the original color profile.

17. A non-transitory machine-readable storage medium storing instructions that upon execution cause a system to:
    receive a color sample comprising a color measurement of a subset of a gamut of colors printable by a printer;
    compute a forward transform value and a reverse transform value based on a color profile calculated from a profiling chart comprising a set of estimated color samples calculated based on the received color sample, the forward and reverse transform values to convert between colorimetry values and color values for the printer; and provide an adjusted color profile for the printer based on an original color profile for the printer and the computing, wherein the original color profile for the printer is associated with a substrate.

18. The non-transitory machine-readable storage medium of claim 17, wherein the instructions upon execution cause the system to generate the adjusted color profile based on the forward transform value or the reverse transform value.

19. The non-transitory machine-readable storage medium of claim 17, wherein the instructions upon execution cause the system to populate a forward color lookup table of the adjusted color profile using the forward transform value, and populate a reverse color lookup table of the adjusted color profile using the reverse transform value.

20. The non-transitory machine-readable storage medium of claim 17, wherein the instructions upon execution cause the system to:

calculate an estimated forward transform value based on the received color sample; and populate the profiling chart comprising the set of estimated color samples using the estimated forward transform value, the estimated forward transform value different from the forward transform value computed based on the color profile calculated from the profiling chart.

* * * * *

UNITED STATES PATENT AND TRADEMARK OFFICE
CERTIFICATE OF CORRECTION

PATENT NO. : 10,334,142 B2
APPLICATION NO. : 15/458741
DATED : June 25, 2019
INVENTOR(S) : Peter Morovic et al.

Page 1 of 1

It is certified that error appears in the above-identified patent and that said Letters Patent is hereby corrected as shown below:

In the Claims

In Column 9, Line 65, Claim 6, after "the" delete "deduced".

Signed and Sealed this
Seventeenth Day of September, 2019

Andrei Iancu
*Director of the United States Patent and Trademark Office*